United States Patent
Madden et al.

(10) Patent No.: US 7,043,565 B1
(45) Date of Patent: May 9, 2006

(54) SYSTEM AND METHOD FOR TRANSFERRING DATA OVER AN EXTERNAL TRANSMISSION MEDIUM

(75) Inventors: David W. Madden, Austin, TX (US); Aljosa Vrancic, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1169 days.

(21) Appl. No.: 09/638,051

(22) Filed: Aug. 11, 2000

(51) Int. Cl.
*G06F 15/16* (2006.01)

(52) U.S. Cl. ............... 709/250; 709/217; 709/236; 709/230; 709/231; 710/6; 710/33; 710/35; 719/310; 719/316; 719/321; 718/100

(58) Field of Classification Search ........ 709/200–202, 709/217, 223, 226, 230, 236, 231, 250; 710/6, 710/33, 55; 719/310, 316, 321; 718/100
See application file for complete search history.

(56) References Cited

U.S. PATENT DOCUMENTS

| | | | |
|---|---|---|---|
| 5,659,749 A | 8/1997 | Mitchell et al. | |
| 5,664,092 A | 9/1997 | Waites | |
| 5,678,063 A | 10/1997 | Odom et al. | |
| 5,686,917 A | 11/1997 | Odom et al. | |
| 5,748,916 A | 5/1998 | Conway et al. | |
| 5,875,313 A * | 2/1999 | Sescila et al. | 710/305 |
| 6,052,743 A | 4/2000 | Schwan et al. | |
| 6,389,464 B1 * | 5/2002 | Krishnamurthy et al. | 709/220 |
| 6,449,697 B1 * | 9/2002 | Beardsley et al. | 711/137 |

* cited by examiner

*Primary Examiner*—Dung C. Dinh
*Assistant Examiner*—Kevin Parton (57) ABSTRACT

A system and method for transferring data over an external transmission medium. A host computer is coupled to a device through a serial bus. A transfer object is configurable to encapsulate data transfer-related functionality, providing a generic interface for transmission of data over a variety of external transmission media and protocols. A user makes one or more transfer requests. Transfer objects corresponding to each request are built and linked together to form a sequential chain. The requests of the transfer objects are executed sequentially. If the current transfer object is the first in the chain, the request is executed on a current thread at passive level or higher, otherwise the request is executed on a system (kernel) thread at dispatch level. When a response to the request returns, control is returned to the current transfer object. The process is repeated until all transfer objects are processed.

32 Claims, 11 Drawing Sheets

SYSTEM AND METHOD FOR TRANSFERRING DATA OVER AN EXTERNAL TRANSMISSION MEDIUM

BACKGROUND OF THE INVENTION

1. Field of the Invention

This invention relates to data communications and data delivery over communication media between a host computer and a device, such as in host computer-based data acquisition systems.

2. Description of the Related Art

In many applications it is necessary or desirable for a host computer system to communicate data with an external device. Various transmission media and protocols exist for enabling communication between a host computer system and an external device. Examples of these types of external transmission media include IEEE 1394, the Universal-Serial Bus (USB), and other serial or parallel buses which enable packet-based communication. Also, a generic method to communicate data across multiple operating systems is desirable.

Typically, the host computer system includes communication logic for interfacing with the external communication line. For example, in a computer system which includes IEEE 1394 communication capabilities, the computer system includes an IEEE 1394 interface for communication through the IEEE 1394 bus. The computer system also typically includes various layers of driver software which allow an application to interface with and use the IEEE 1394 bus for communicating with the external device. One problem that often arises with host computer driver software which is used to interface to an external communication medium is that the host software requires numerous context switches between user mode and kernel mode. As is well known in the art, a user mode/kernel mode transition requires a context switch by the CPU. This generally requires a large amount of CPU resources or cycles to make the context switch each time a user mode/kernel mode transition occurs. Therefore, it would be desirable to provide a host computer driver software implementation which is operable to communicate with an external communication medium that minimizes user mode/kernel mode transitions.

Host computer software which interfaces to an external communication medium may also sustain passive/dispatch level transitions. Dispatch level is the highest level of software interrupt, just below hardware interrupts in priority. Passive/dispatch level transitions typically occur when a process running at dispatch level must wait for a response or for a resource to become available. Explicit 'waits' may not be performed at dispatch level, but must instead be performed at a passive level. For example, an interrupt routine handling non-page-locked memory must be executed at passive level because memory paging requires waiting. Similarly, synchronous communication (I/O) between a host computer and a 1394 device must be performed at passive level because the host computer must wait for responses from the 1394 device. Thus, a process running at dispatch level must transition to passive level to execute a task which entails an explicit wait. Also, many kernel functions are only meant to run at passive level. Therefore, between successive reads or writes, it is typically the case that a passive level routine requests a read/write operation. The Interrupt Service Routine (ISR) (running at dispatch) is dispatched upon completion of the transaction. The ISR copies data over, and signals to the passive level thread to continue with its next read/write. These transitions also result in a large amount of overhead on the host CPU. In particular, dispatch/passive transitions may degrade performance by several orders of magnitude due to passive level context switching in pre-emptive multi-tasking kernel systems, such as Microsoft Corporation's Windows NT 2000. Therefore, a system and method is also desired for reducing the number of passive/dispatch level transitions in the communication process.

A problem that frequently occurs in multi-threaded operating systems is that threads used for communicating with the external communication medium may be required to operate in a particular mode, such as user or kernel mode at passive or dispatch level. The operating system may allocate multiple threads in different time slots. Thus, threads used for managing the external communication medium may be interspersed with other threads that may be required to operate in a different mode, i.e., in a different user/kernel mode or at a different passive/dispatch level. This results in a large number of context switches by the CPU as the different threads are executed. Therefore, it would be desirable to provide a system which minimizes these types of context switches.

Another issue associated with host driver software related to external transmission media is the effort typically required to developed new drivers for particular buses and their related protocols. As is well known in the art, new driver software is generally written 'from scratch', because of the many dependencies of the software upon the operating system, the bus, and associated protocols. This approach requires significant resources in terms of both time and effort involved, and often impedes the rapid adoption and support of new transmission media and protocols. Therefore, an improved method and system for implementing driver software is desired.

SUMMARY OF THE INVENTION

The present invention comprises various embodiments of a system and method for transferring data over an external transmission medium. A host computer may be coupled to a device, such as an instrument, which may be further coupled to a sensor. The instrument may be a data acquisition (DAQ) device, which combined with the sensor, may be operable to collect data concerning pressure, temperature, chemical content, current, resistance, voltage, audio or image data, or any other detectable attribute. The host computer may be operable to control the instrument by sending requests to read from or write to the instrument's memory registers. The host computer may be further operable to obtain data from the instrument for storage and analysis on the host computer system. In one embodiment, the host computer may comprise a computer system, wherein the computer system is coupled to the instrument through a serial bus, such as an IEEE 1394 bus, as described in an IEEE 1394 protocol specification. In other embodiments the bus may implement other protocols such as Ethernet, USB, TCP/IP, or any other serial or parallel communication protocol.

A transfer object may be configurable to encapsulate data transfer-related functionality to provide a generic interface for transmission of data over a variety of external transmission media and protocols. The transfer object may include transfer information including a transfer type specification describing the kind of data transfer of a particular transfer request, such as synchronous single-point read, synchronous single-point write, asynchronous single-point read, asynchronous single-point write, synchronous block read, synchronous block write, asynchronous block read, asynchronous block write, synchronous random read, asynchronous random read, 1394 asynchronous random read, and 1394 synchronous random read.

The transfer object may further include a request block object which may provide a generic operating system(OS)-independent and bus-independent interface encapsulating OS-dependent and protocol/bus-dependent data related to the transfer. The transfer object may also include various callback functions, such as a static callback function, an intrinsic callback function, and an optional pointer to a user callback function, as well as a link to another transfer object, thus providing a mechanism whereby multiple transfer objects may be chained together sequentially. Finally, a toolbox may be included as part of the data transfer system, which may encapsulate inter-driver communication functions which may be accessed by the transfer object to navigate through layers of driver software between the application software and the bus hardware.

According to one embodiment of the present invention, a user application may request one or more transfer requests. Such transfer requests may originate with the application software and may be received by 1394 PAL-FW driver, such as National Instrument's NI-PAL F/W driver program, and may comprise a variety of requests to a remote device such as data reads, data writes, control requests, or any other type of data transfer related to remote device management or use.

Transfer objects corresponding to each of the plurality of data transfer requests may be built and linked together to form a sequential chain. The information required to execute each request may be included in the corresponding transfer object. The chain of transfer objects may then be submitted for execution by calling a perform request function on the first transfer object in the chain. The request of each transfer object in the chain may then be executed sequentially. If the current transfer object is the first transfer object in the chain, then the request of the current transfer object may be executed on a current thread at passive level or higher, in either user mode or kernel mode. If the current transfer object is not the first transfer object in the chain, the request of the current transfer object may be executed on a system (kernel) thread at dispatch level.

When a request is executed, the transfer object may execute functions from the toolbox to navigate through intervening software/driver layers, down to the hardware layer where the request may be sent over the bus to the remote device. When a response to the request comes back over the bus, the OS may use a new system thread at kernel-dispatch level to execute a static callback function of the transfer object to return control to the current transfer object. Then the current transfer object may execute an intrinsic callback function of the current transfer object on the system thread at kernel-dispatch level to complete the transaction and set an event indicating completion of the request. The transaction may be completed by copying response information from a buffer into main memory, such as with a read.

The static callback function may determine whether there is a user callback function attached to the current transfer object. If so, the user callback function may be executed on the system thread at kernel-dispatch level. The user callback may log information, such as timing information, for profiling the request process.

If there are no further transfer objects in the chain the process is finished. If there is another transfer object in the chain then the request of that transfer object may be performed on the system thread at kernel-dispatch level, and the process may continue as described above until there are no more transfer objects to process.

In one embodiment, after the request of the first transfer object in the chain is performed on the current thread, the caller may call a wait function on the last transfer object, putting its thread into sleep mode. Later, when the last transfer object has completed its request, the last transfer object may execute its callback function to set an event (on the last system thread at kernel-dispatch level). The waiting thread which is in sleep mode (and at kernel-passive level) may then be awakened in response to the event, and continue processing.

By using the above process of creating transfer objects and chaining them together for execution, the transitions back and forth between passive and dispatch level thread execution for each of the transfer request executions may be reduced up to 10,000% or avoided, saving significant overhead costs in terms of CPU time and resources. If the series of requests is initiated in user mode (passive), rather than kernel mode (passive), the present invention may provide even greater benefits with respect to overhead as the corresponding user/kernel mode transitions may be avoided, given that user/kernel mode transitions are generally very expensive in terms of CPU cycles. Furthermore, the modular design of the transfer object which encapsulates the platform-dependent aspects of the data-transfer process makes it much easier to develop and maintain driver software for a variety of different platforms and buses/protocols.

BRIEF DESCRIPTION OF THE DRAWINGS

Other advantages and details of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Pat. No. 5,875,313 titled "PCI Bus to IEEE 1394 Bus Translator Employing Write Pipe-Lining and Sequential Write Combining", whose inventors are Glen O. Sescila III, Brian K. Odom, and Kevin L. Schultz, and which issued on Feb. 23, 1999, is hereby incorporated by reference in its entirety as though fully and completely set forth herein.

Figure 1:
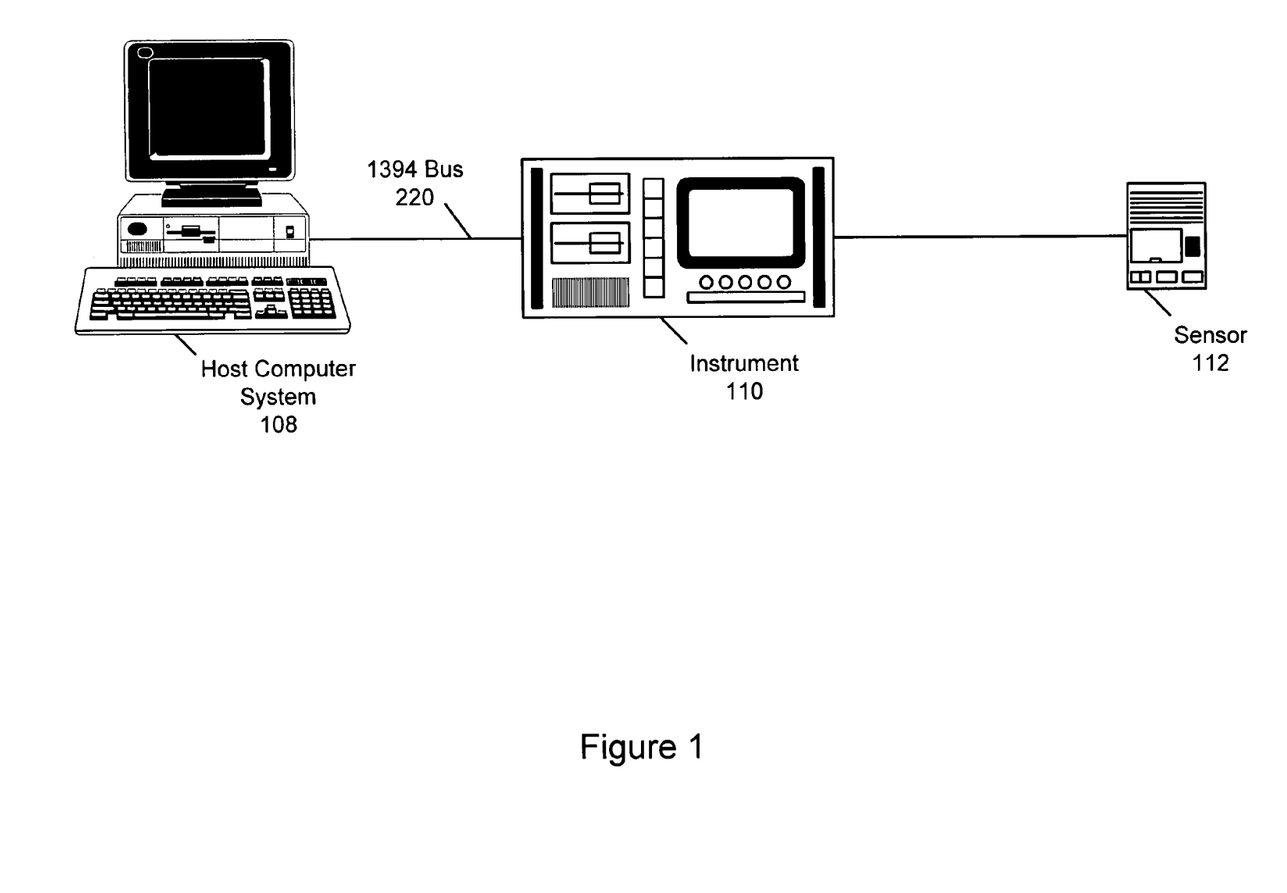
FIG. 1 illustrates a data acquisition system, according to one embodiment.

FIG. 1—A Data Acquisition System

FIG. 1 illustrates a data acquisition system according to one embodiment. It is noted that the present invention may be used in various types of systems where a host computer communicates with an external device. Exemplary systems include test and measurement systems, industrial automation systems, process control systems, robotics systems and other types of systems. In the preferred embodiment described below, the device is a data acquisition (DAQ) device, and the system is a computer-based DAQ system.

As FIG. 1 shows, a host computer system 108 may be coupled through a communication medium 220 to a data acquisition device or instrument 110 which may be further coupled to a sensor 112. In a preferred embodiment, the bus 220 may be an IEEE 1394 bus, such as described in the current or future IEEE 1394 protocol specifications, although in other embodiments the bus may implement other protocols such as Ethernet, USB, TCP/IP, or any other serial or parallel communication protocol. The following describes one embodiment of the present invention which uses the IEEE 1394 bus, although it is noted that the invention may be used with any of various communication media.

The sensor 112 may be any type of transducer which is operable to detect environmental conditions and send sensor data to the instrument 110. The instrument 110 may be a data acquisition (DAQ) device, which combined with the sensor 112, may be operable to collect data concerning pressure, temperature, chemical content, current, resistance, voltage, audio or image data, or any other detectable attribute. For example, the DAQ system may be an image acquisition system or a machine vision system. The instrument or DAQ device 110 may also include data generation capabilities. The host computer system 108 may be operable to control the instrument 110 by sending requests to read from or write to the instrument's memory registers. The host computer system 108 may be further operable to obtain data from the instrument 110 for storage and analysis on the host computer system 108, either by issuing read requests or by programming the instrument 110 to send data to the memory of the host computer 108.

The host computer 108 preferably includes a memory medium on which computer programs of the present invention may be stored. The host computer executes instructions from the memory medium to handle device retry requests on the communication medium 220. The memory medium may include a software architecture similar to that shown in FIG. 4.

Figure 2A:
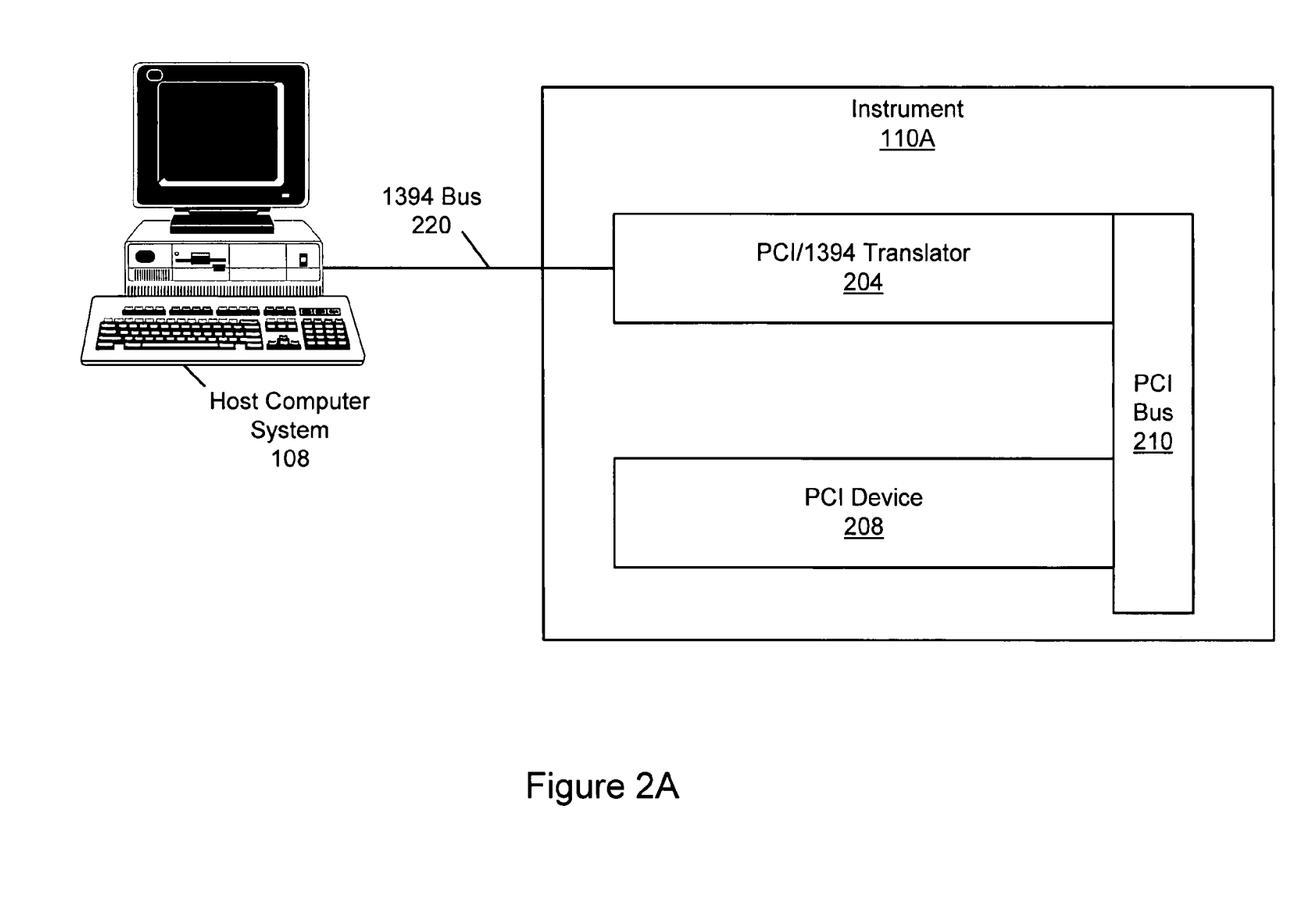
FIG. 2A illustrates a 1394/PCI data acquisition system, according to one embodiment.

FIG. 2A: A 1394/PCI Data Acquisition System

FIG. 2A illustrates one embodiment of the data acquisition system 110. As shown in FIG. 2A, host computer system 108 may be coupled to a PCI instrument 110A through serial bus 220, such as an IEEE 1394 bus.

In one embodiment, as shown in FIG. 2A, the instrument 110A may include a PCI device 208 which may be coupled to a PCI/1394 translator 204 through a PCI bus 210. In one embodiment, the translator 204 may include a National Instruments FirePHLI™, which provides translation between the IEEE 1394 protocol and PCI, and error management, described below with reference to FIG. 5. The host computer system 108 may be operable to communicate with the PCI device 208 through the 1394 bus 220 via the 1394/PCI translator 204. The 1394/PCI translator 204 may be operable to translate between the 1394 and PCI address spaces, allowing the host computer system 108 to send 1394 requests to and receive 1394 responses from the PCI device 208. The 1394/PCI translator thus allows existing PCI devices to be used in an IEEE 1394 system. For more information on the 1394/PCI translator 204, please see U.S. Pat. No. 5,875,313 titled "PCI Bus to IEEE 1394 Bus Translator Employing Write Pipe-Lining and Sequential Write Combining", which was incorporated by reference above.

Figure 2B:
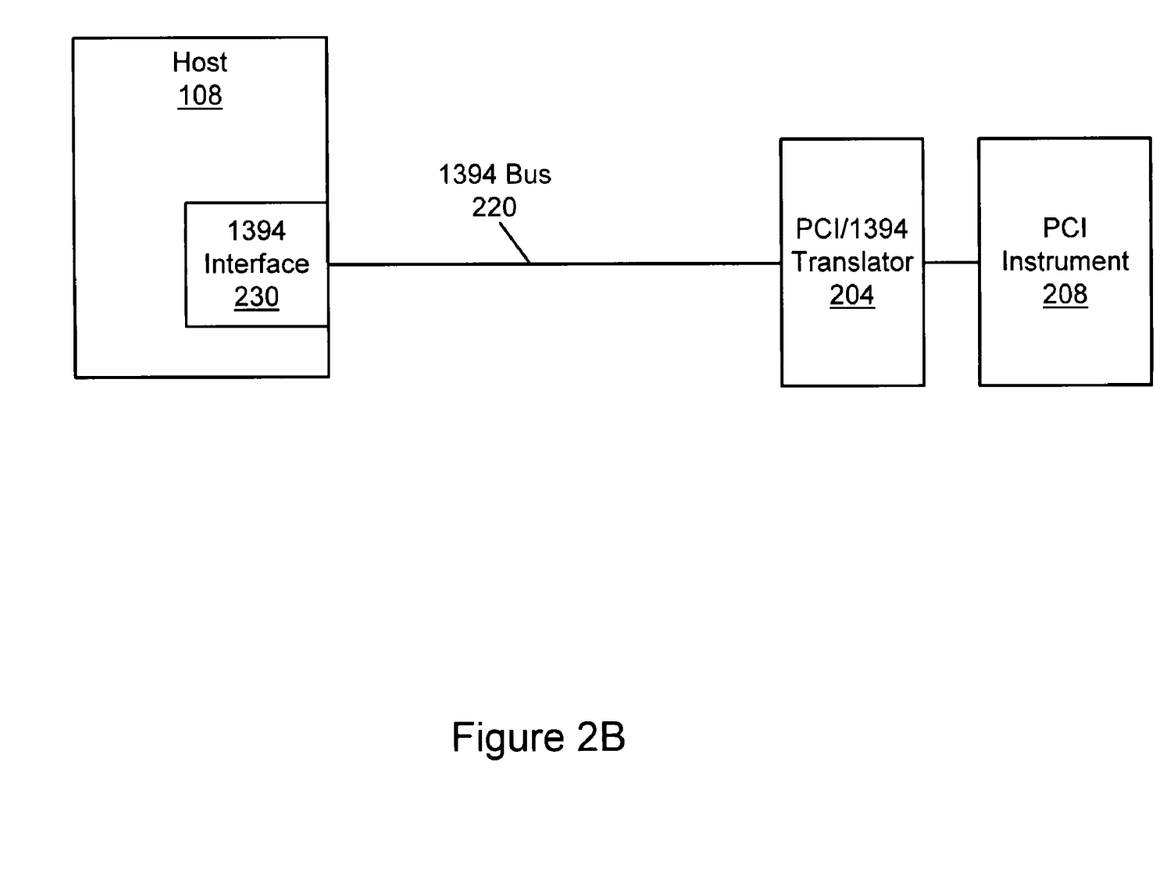
FIG. 2B is a block diagram of a 1394/PCI data acquisition system, according to one embodiment.

FIG. 2B: A 1394/PCI Data Acquisition System

FIG. 2B is a block diagram of the data acquisition system of FIG. 2A, according to one embodiment. As FIG. 2B shows, host 108 may be communicatively coupled to PCI instrument 208 through 1394 bus 220 and 1394/PCI translator 204, described above with reference to FIG. 2A. Host 108 may be connected to the 1394 bus 220 via a 1394 interface 230.

Figure 3A:
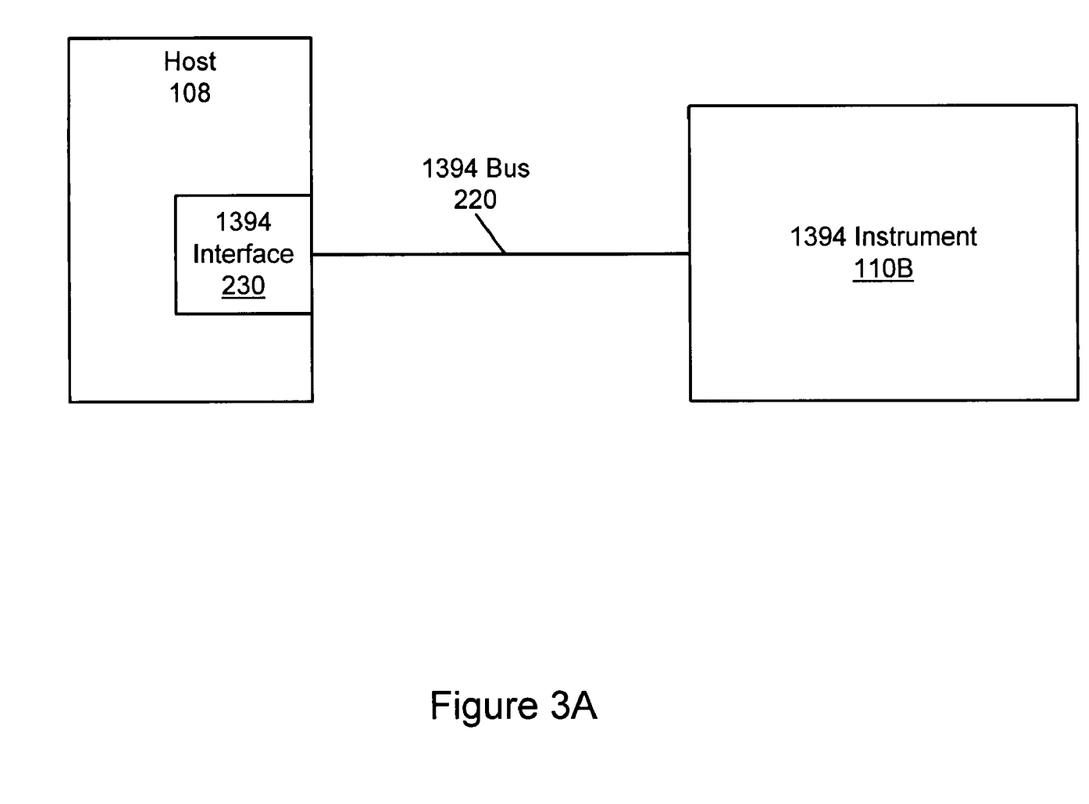
FIG. 3A is a block diagram of a 1394 data acquisition system, according to one embodiment.

FIG. 3A: A 1394 Data Acquisition System

FIG. 3A is a block diagram of a 1394 data acquisition system, according to one embodiment. As shown in FIG. 3A, the host 108 may be communicatively coupled to a 1394-compliant instrument 110B through 1394 bus 220. Host 108 may be connected to the 1394 bus 220 via 1394 interface 230. In this embodiment, because the instrument 110B is compliant with the IEEE 1394 protocol, translator 204 is not required.

Figure 3B:
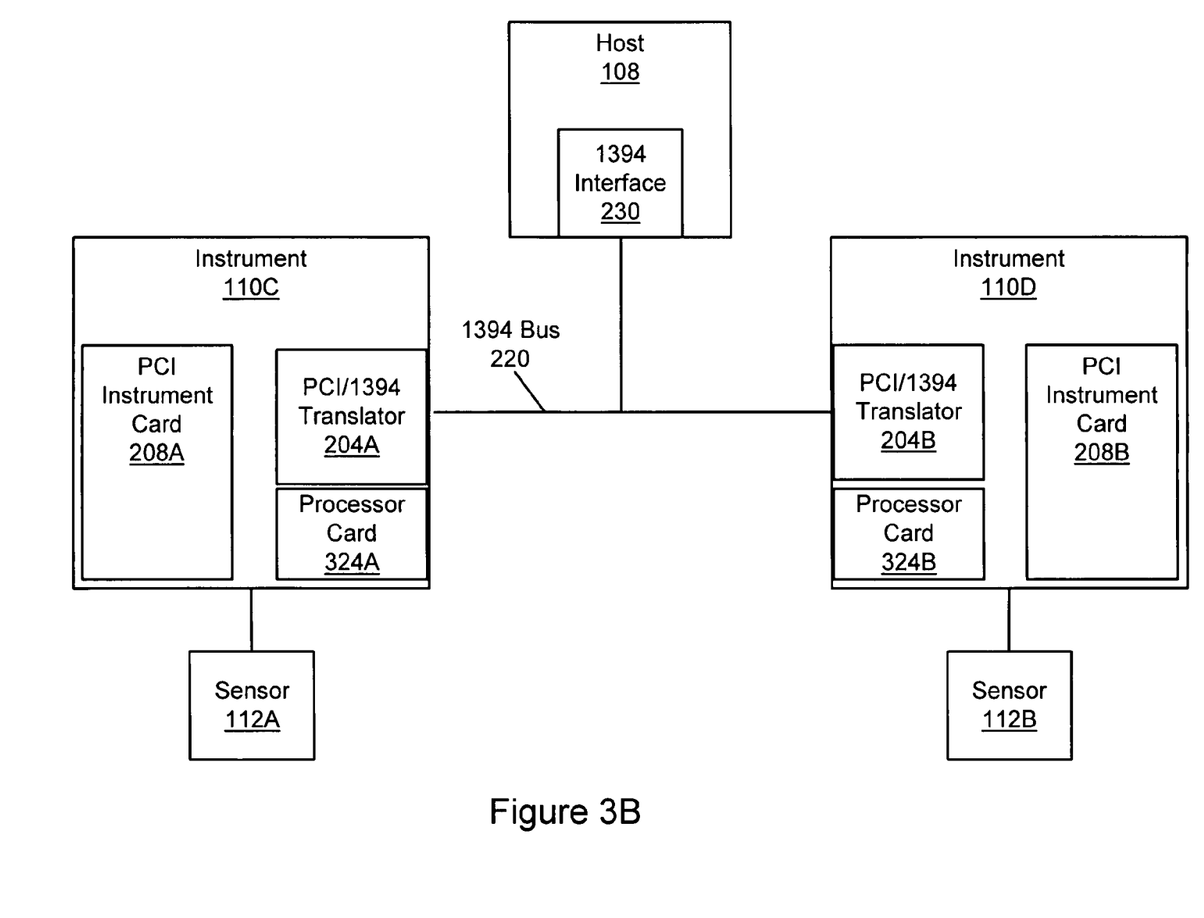
FIG. 3B is a block diagram of a 1394/PCI data acquisition system, according to another embodiment.

FIG. 3B: Another 1394 Data Acquisition System

FIG. 3B is a block diagram of a 1394 data acquisition system, according to another embodiment. In FIG. 3B, a host computer system and two 1394—compliant instruments 110C and 110D may be coupled together via the 1394 bus 220. Each instrument 110 may be further coupled to a sensor 112 (A and B). In one embodiment, each instrument 110 may be configured with a processor card 324 with memory on board to execute driver software, a PCI instrument card 208 which may be operable to accept and manage sensor data from sensor 112, and a 1394/PCI bridge or translator 204, such as a National Instruments FirePHLI™, which provides translation between the IEEE 1394 protocol and PCI, and error management, described below with reference to FIGS. 5A and 5B. In some embodiments, the processor card 324 may include any of a variety of processors, such as a CPU, or a Field Programmable Gate Array (FPGA), as well as memory for storing programs and data. In one embodiment, the primary function of the host 108 is to configure the two instruments 110C and 110D for the bus 220 so that the two instruments 110C and 110D may communicate with each other as peers. Once the two instruments 110C and 110D are configured for the bus 220, the host 108 may no longer be needed for further operations, although it should be noted that the host 108 should not be disconnected because this may cause a bus reset, which would then require that the two instruments 110C and 110D be configured again.

Figure 4:
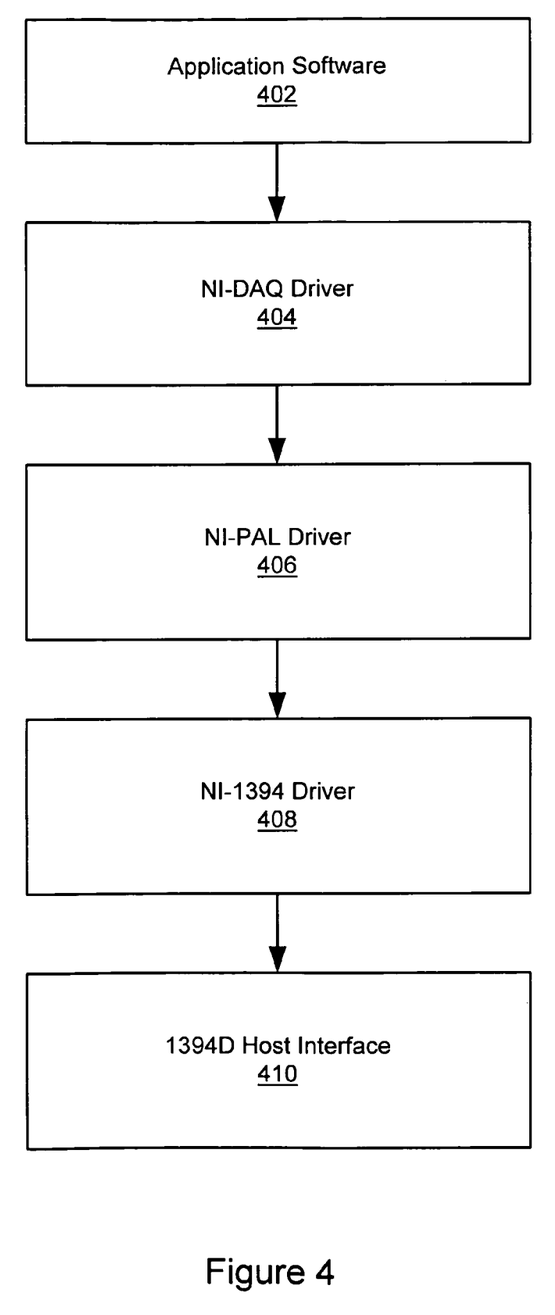
FIG. 4 is a block diagram of the software architecture of the system, according to one embodiment.

FIG. 4: Software Architecture

FIG. 4 is a block diagram of the software architecture of the system, according to one embodiment. As FIG. 4 shows, the top layer of the software architecture may be application software 402. The application software 402 may be any software program which may be operable to provide an interface for control and/or display of a data acquisition (DAQ) process. In one embodiment, the software application 402 may include a program developed in National Instrument's LabVIEW™ or LabWindows/CVI development environments. A driver program 404 may be below the application software 402. The driver 404 may be a DAQ driver 404, such as National Instrument's NI-DAQ driver program. The next software layer may optionally be a platform abstraction layer (PAL) driver 406, such as National Instrument's NI-PAL driver program. The PAL 406 may operate to abstract the internal communication bus and operating system to a common API. A 1394 platform abstraction layer firewire (PAL-FW) 1394 driver 408, such as National Instrument's NI-PAL F/W driver program, may be below the NI-PAL driver 406. This software preferably manages the data transmission process using transfer objects according to one embodiment of the present invention, described below with reference to FIGS. 5–8. A 1394D host interface 410 may be below the NI-PAL F/W driver 408, such as provided by Microsoft Corporation, which abstracts the 1394 chipset driver layer. The 1394D host interface 410 provides an interface to 1394 chipset driver software, such as OHCI 1394 driver software, which interfaces with the relevant hardware; i.e., the 1394 interface hardware.

Figure 5:
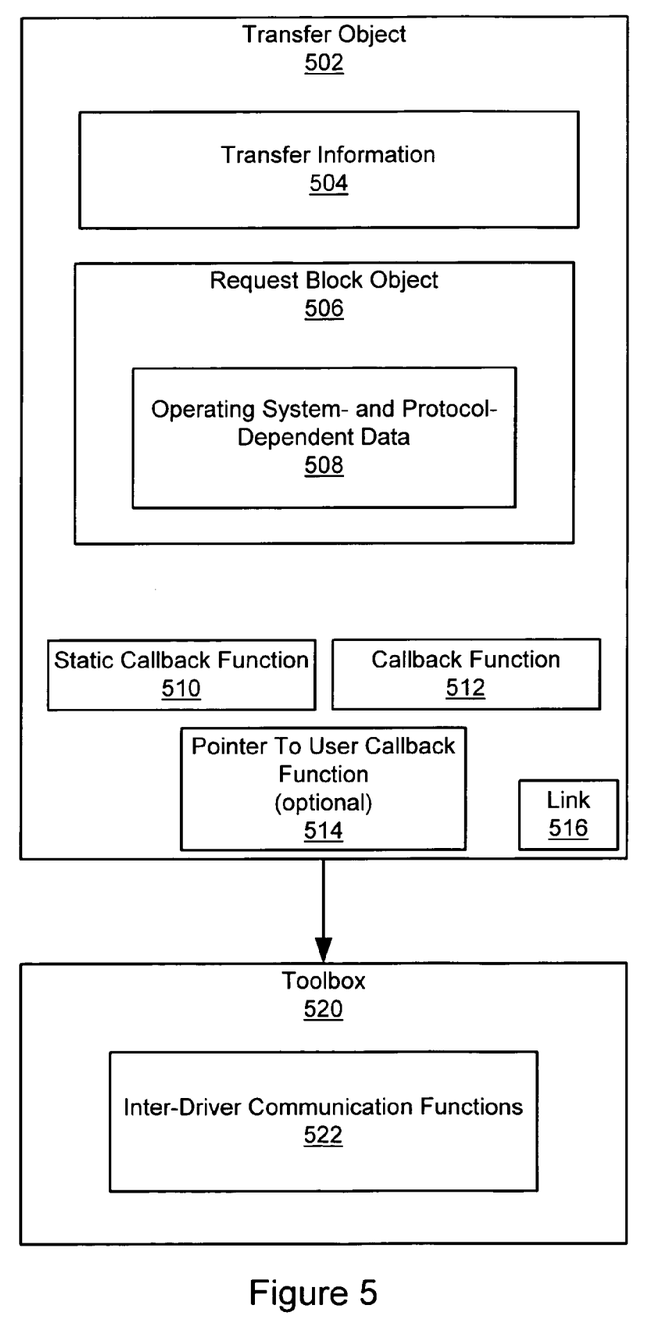
FIG. 5 is a block diagram of a transfer object, according to one embodiment.

FIG. 5: Transfer Object

FIG. 5 is a block diagram of one embodiment of a transfer object. A transfer object may be configurable to encapsulate data transfer-related functionality to provide a generic interface for transmission of data over a variety of external transmission media and protocols. In the preferred embodiment, the NI-1394 driver 408 creates and uses transfer objects for improved data transfers on the bus 220. As FIG. 5 shows, transfer object 502 may include transfer information 504, which may include a transfer type specification describing the kind of data transfer of a particular transfer request, described below with reference to FIG. 5A.

In one embodiment, the transfer object 502 may further include a request block object 506 which may provide a generic OS-independent and bus-independent interface encapsulating OS-dependent and protocol/bus-dependent data 508 related to the transfer. In one embodiment, the transfer object 502 may also include various callback functions, such as a static callback function 510 (common to all derived transfer objects), an intrinsic callback function 512, and an optional pointer to a user callback function 514, whose uses are described below with reference to FIGS. 7 and 8 below.

The transfer object 502 may also include a link 516 to another transfer object, thus providing a mechanism whereby multiple transfer objects may be chained together sequentially, a feature whose utility is also described below with reference to FIGS. 6–8.

Finally, as can be seen in FIG. 5, a toolbox 520 may be included as part of the data transfer system. The toolbox 520 may encapsulate inter-driver communication functions 522 which may be accessed by the transfer object 502 to navigate through layers of driver software between the application software and the bus hardware, as described with reference to FIG. 4, above.

Figure 5A:
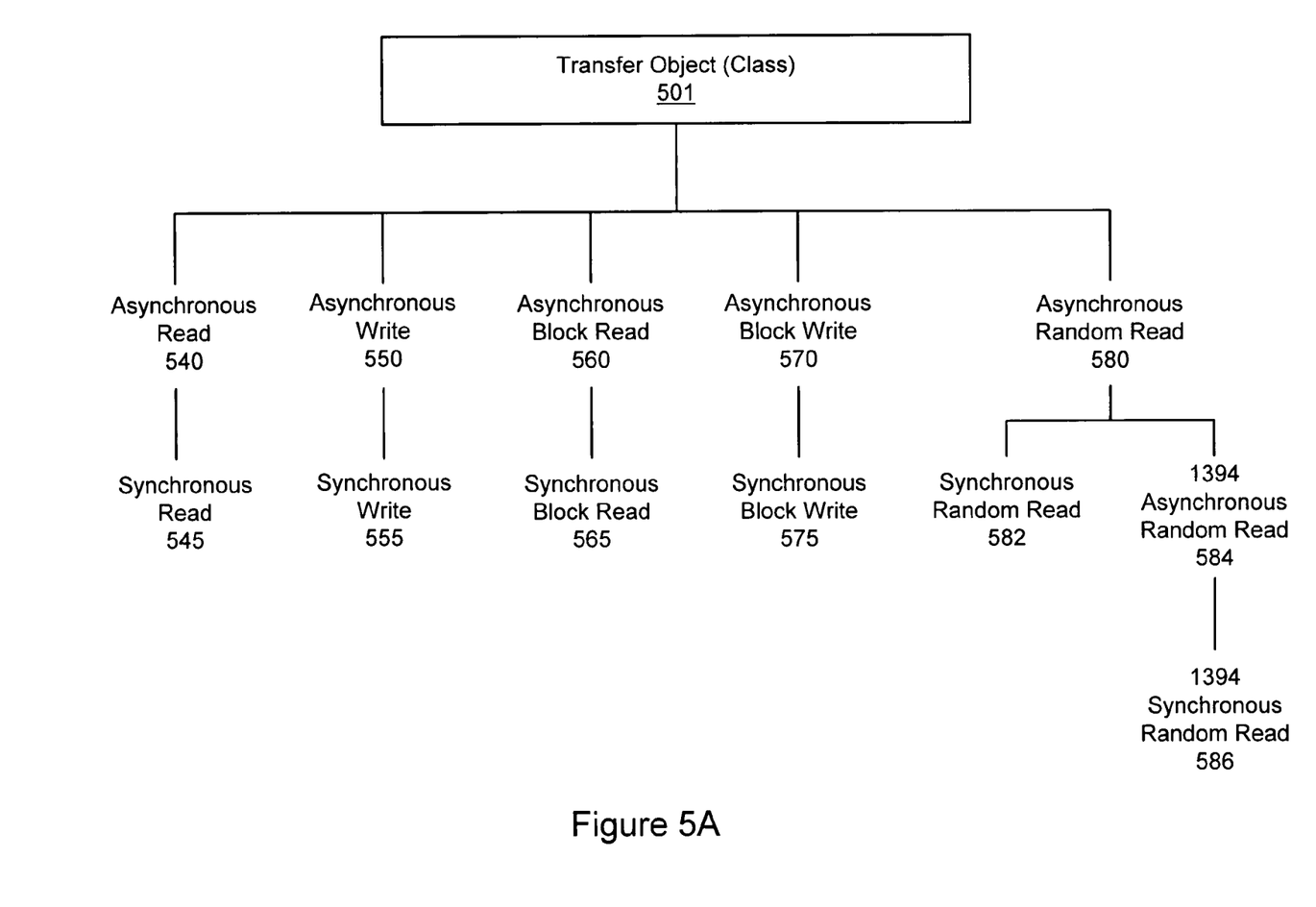
FIG. 5A is a diagram of transfer object transfer types, according to one embodiment.

FIG. 5A: Transfer Object Transfer Types

As mentioned above with reference to FIG. 5, transfer information 504 may include a transfer type specification describing the kind of data transfer of a particular transfer request. FIG. 5A shows a hierarchy of transfer types which may be included in a transfer object's transfer information. Transfer types may include asynchronous single-point read 540, synchronous single-point read 545, asynchronous single-point write 550, synchronous single-point write 555, asynchronous block read 560, synchronous block read 565, asynchronous block write 570, synchronous block write 575, asynchronous random read 580, synchronous random read 582, as well as 1394 asynchronous random read 584, and 1394 synchronous random read 586. Although not shown, in various embodiments, asynchronous random write, synchronous random write, 1394 asynchronous random write, and 1394 synchronous random write may be included in the transfer object transfer types.

The hierarchy shows one embodiment of an inheritance tree for transfer object classes. In one embodiment, generic transfer object class 501 is the root class from which the transfer type-specific transfer object classes may be derived. Specifically, the asynchronous transfer classes, such as asynchronous single-point read 540, asynchronous single-point write 550, asynchronous block read 560, asynchronous block write 570, asynchronous random read 580, and 1394 asynchronous random read 584 may be directly inherited from the transfer object class 501. As may be seen in FIG. 5A, the synchronous transfer classes, such as synchronous single-point read 545, synchronous single-point write 555, synchronous block read 565, synchronous block write 575, synchronous random read 582, and 1394 synchronous random read 586, may be inherited from the corresponding asynchronous transfer classes, because the system typically operates in asynchronous mode, and synchronous mode generally requires all of the properties of the asynchronous mode plus one extra attribute: requiring a performRequest function of a transfer object to block until the transfer object's transaction is completed.

In one embodiment, asynchronous/synchronous reads and writes may refer to single point reads and writes, wherein each read or write transfers data to or from a single memory address. In contrast, block reads and writes may refer to sequential reads or writes to or from memory which may be packaged together in one transfer object.

Random reads and writes may refer to multiple data reads and writes to scattered memory locations or offsets. In one embodiment, the system hardware, such as the 1394 bus or USB and related hardware, may be operable to perform random writes, such that a set of random data writes may be collected into one packet, which may improve performance as compared to sending each write in its own packet.

In one embodiment, the 1394 hardware, e.g., the translator 204, may not provide true random read capability, in which case 1394-specific random read transfer object subclasses may be derived from the general random read transfer object classes, and provide special logic to handle the data transfer operation, as shown in FIG. 5A.

Figure 6:
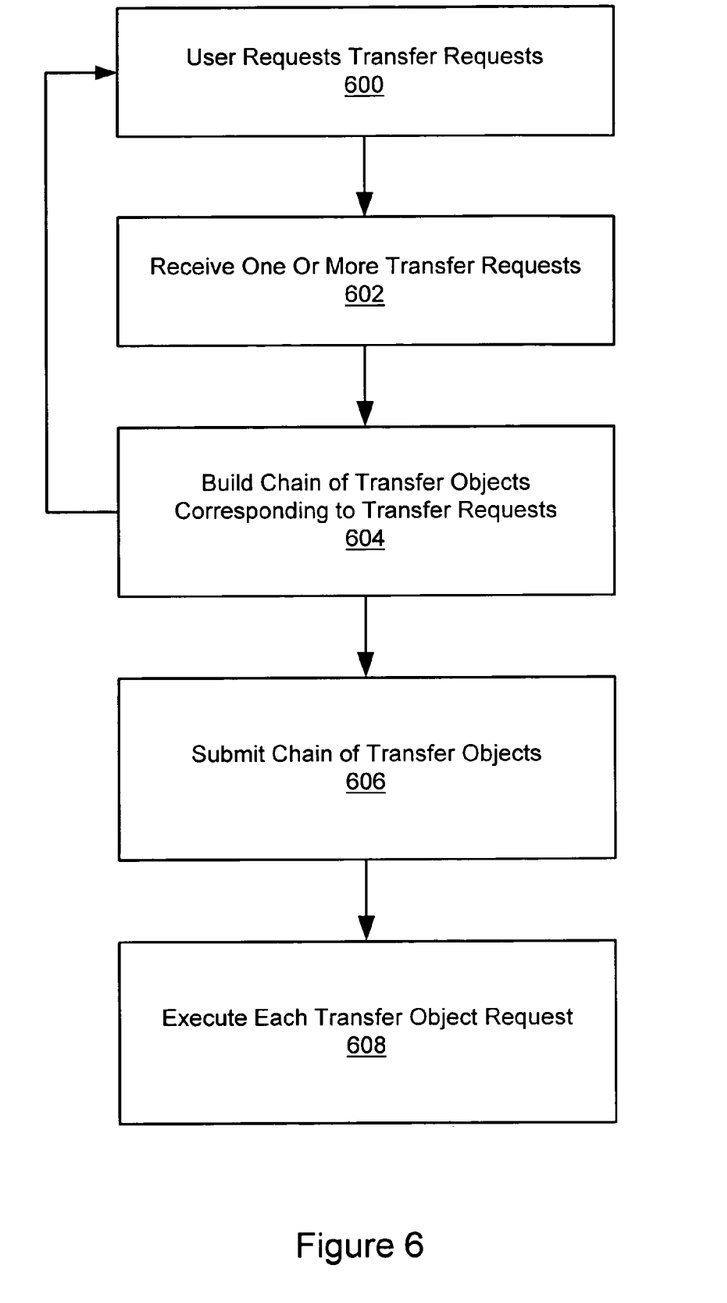
FIG. 6 is a flowchart of the request process, according to one embodiment.

FIG. 6: Flowchart of the Request Process

FIG. 6 is a high-level flowchart of the request process, according to one embodiment of the present invention. As FIG. 6 shows, in 600 a user application 402 requests one or more transfer requests, then in 602 a plurality of data transfer requests may be received by the NI-1394 driver 408. Such transfer requests may originate with the application software 402 referenced in FIG. 4, and may be received by 1394 PAL-FW driver 408, such as National Instrument's NI-PAL F/W driver program, also referenced in FIG. 4. The transfer requests may comprise a variety of requests to a remote device or instrument, as described above with reference to FIGS. 2 and 3, such as data reads, data writes, control requests, or any other type of data transfer related to remote device management or use.

In 604, transfer objects corresponding to each of the plurality of data transfer requests may be built and linked together to form a sequential chain. The information required to execute each request may be included in the corresponding transfer object, as described above with reference to FIG. 5, above. Further details of this build process are described with reference to FIG. 7, below. In one embodiment, because the process may be asynchronous, steps 600–604 may occur in an iterative fashion, i.e., the user may request more transfer requests before the chain of transfer requests is submitted in 606, in which case the transfer requests will be received, as indicated in 602, described above, and added to the chain of transfer objects, as indicated in 604. This loop may continue until either a flush occurs or until a buffer is full, at which time 606, described below, may be executed.

In 606, the chain of transfer objects may be submitted for execution. In one embodiment of the invention, the submission may be effected by calling a perform request function on the first transfer object in the chain.

In 608, the request of each transfer object in the chain may be executed sequentially, the details of which are described with reference to FIG. 8, below.

Figure 7:
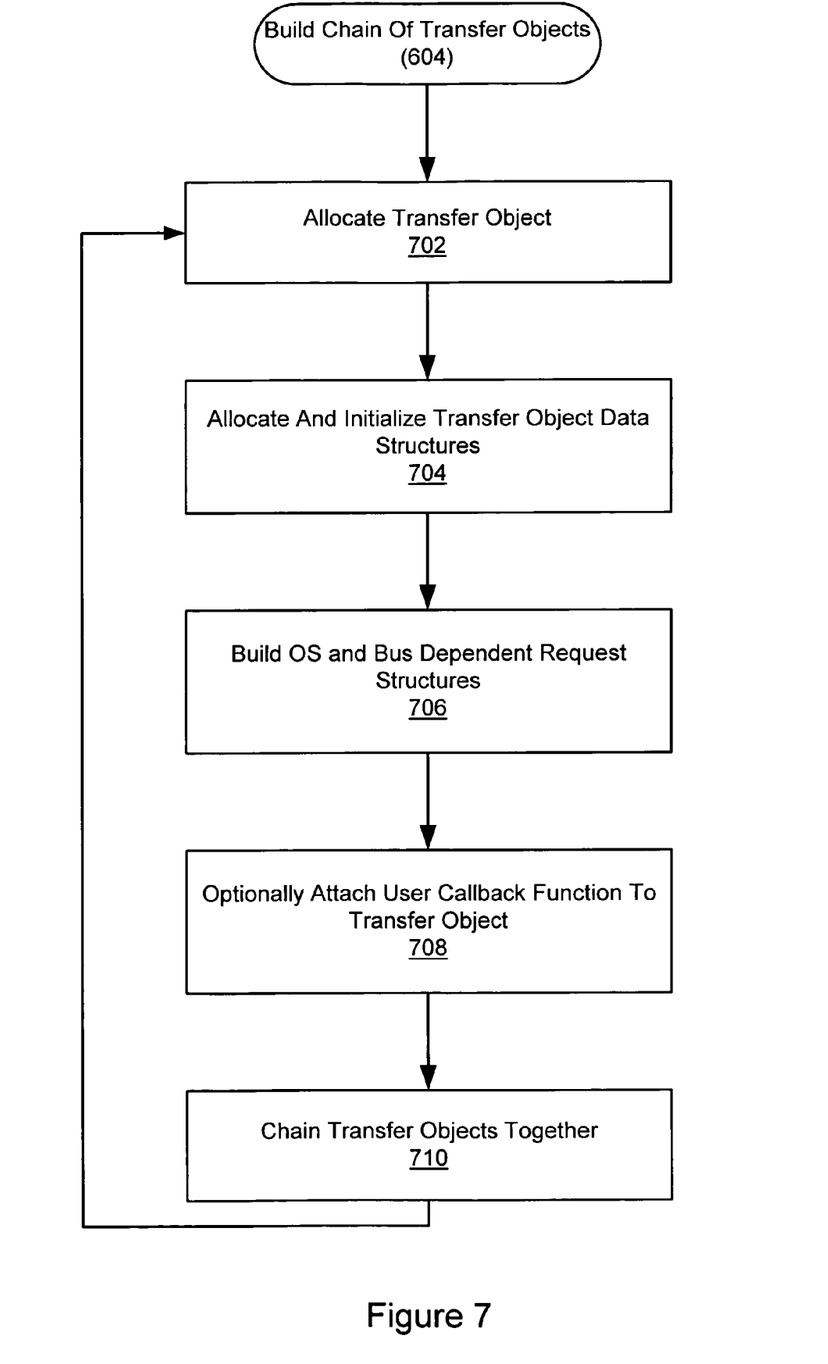
FIG. 7 is a flowchart of the transfer object creation process, according to one embodiment.

FIG. 7: Flowchart of the Transfer Object Chain Creation Process

FIG. 7 is a flowchart of one embodiment of the transfer object chain creation process performed in step 604, of FIG. 6 above. As shown in FIG. 7, in 702 memory may be allocated for a transfer object itself. In 704 memory may be allocated for the component data structures of the transfer object, and initialized with transfer information. In one embodiment, the transfer information for each transfer object may include a transfer type, as well as the data to be transferred. As mentioned above, transfer types may include synchronous single-point read, synchronous single-point write, asynchronous single-point read, asynchronous single-point write, synchronous block read, synchronous block write, asynchronous block read, and asynchronous block write, as well as random read and random write.

In 706, OS-dependent and bus-dependent request structures for the transfer object may be built. In one embodiment, these structures may comprise the request block object mentioned above with reference to FIG. 5, which may provide a generic OS-independent and bus-independent interface encapsulating OS-dependent and protocol/bus-dependent data related to a particular transfer. By encapsulating the platform-dependent data in this way, the interactions with the OS and the particular bus used for the transfer may be abstracted, which may simplify both development and use of the system.

In 708, a user callback function may optionally be attached to the transfer object. The user callback function is preferably a user-defined function associated with a particular transfer object which may be operable to execute a task after the transfer object's request has been executed, such as reporting timing data for execution analysis or profiling.

In 710 the transfer objects may be chained together through the use of the link 516 on each transfer object 502 (except the last), described with reference to FIG. 5 above. Thus the link of each transfer object (except the last) may be configured with a pointer or address to the next transfer object in the chain. In one embodiment, chaining the transfer objects together allows the sequential execution of a plurality of transfer requests while avoiding many of the mode and/or level transitions normally associated with multiple request executions. This issue is described in more detail below with reference to FIG. 8. As shown in FIG. 7, the process described above may be repeated until all transfer objects have been built and chained together.

Figure 8:
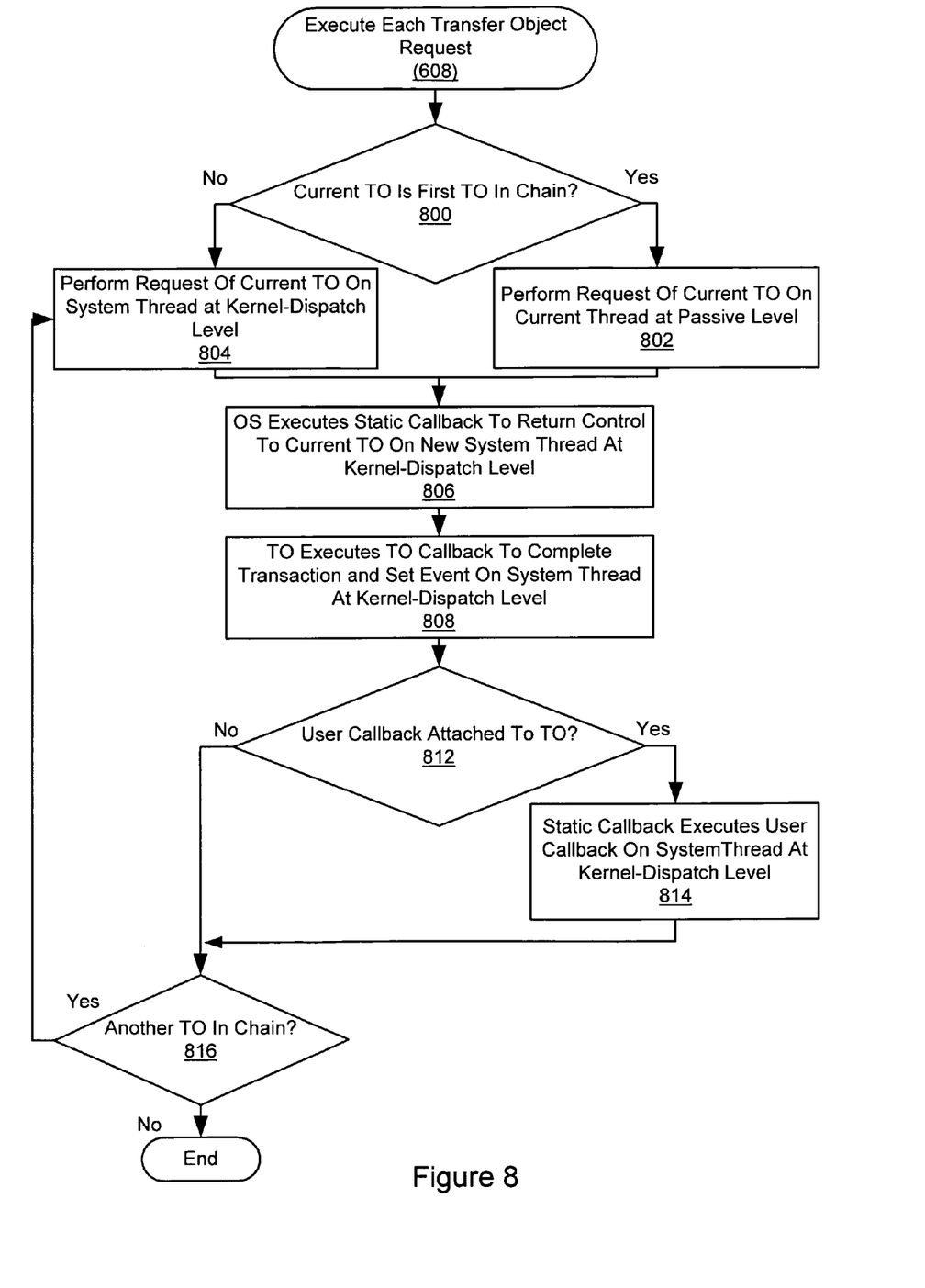
FIG. 8 is a detailed flowchart of the request execution process, according to one embodiment.

FIG. 8: Detailed Flowchart of the Request Execution Process

FIG. 8 is a detailed flowchart of the request execution process, according to one embodiment. More specifically, FIG. 8 is a detailed flowchart of 608, as referenced with respect to FIG. 6, above. In one embodiment, the process may be launched by calling a perform request function on a first transfer object in the chain of transfer objects described with reference to FIGS. 6 and 7. Note that it is assumed that an OS under which the process is implemented supports multi-threading.

In 800, a distinction may be made between executing the request of the first transfer object in the chain of transfer objects and executing the request of any of the remainder of transfer objects in the chain. If the current transfer object is the first transfer object in the chain, then in 802, the request of the current transfer object may be executed on a current thread at passive level. In one embodiment, the current thread may execute in user mode at passive level, e.g. if the thread is executing application software. In another embodiment, the current thread may run in kernel mode at passive level, such as when executing driver software. If, on the other hand, the current transfer object is not the first transfer object in the chain, then in 804, the request of the current transfer object may be executed on a system (kernel) thread at dispatch level.

In one embodiment, when a request is executed, the transfer object may execute functions from the toolbox 520, referenced with respect to FIG. 5 above, to navigate through intervening software/driver layers, referenced in FIG. 4, down to the hardware layer where the request may be sent over the bus to the remote device. When a response to the request comes back over the bus, then in 806 the OS may use a new system thread at kernel-dispatch level to execute a static callback function 510 of the current transfer object to return control to the current transfer object.

Then, in 808 the current transfer object may execute an intrinsic callback function 512 of the current transfer object on the system thread at kernel-dispatch level to complete the transaction and set an event indicating completion of the request. In one embodiment, the transaction may be completed by copying response information from a buffer into main memory, such as with a read.

In 812, the static callback function may determine whether there is a user callback function attached to the current transfer object, as described in 708 of FIG. 7, above. If there is a user callback function attached, then in 814 the user callback function may be executed on the system thread at kernel-dispatch level. As mentioned above in 708 with reference to FIG. 7, the user callback function of a transfer object may be a user-defined function which may be optionally attached to a transfer object during creation, and may be used to execute any task which the user wishes to be done after a particular request has completed. In one embodiment, the user callback may log information, such as timing information, for profiling the request process.

Finally, in 816, if there is another transfer object in the chain then the request of that transfer object may be performed on the system thread at kernel-dispatch level, as indicated in 804, and the process may continue as described above until there are no more transfer objects to process. If there are no further transfer objects in the chain the process is finished.

In multithreaded applications, it is common to divide work among multiple threads. In such cases, one thread might wait for another thread to reach a particular state before proceeding. Some operating systems which support multi-threading provide event objects for thread synchronization. One thread may call a wait function, thus blocking its execution until a certain condition is satisfied. The other thread, after satisfying the condition, may notify the waiting thread by setting an event. In one embodiment, after the request of the first transfer object in the chain is performed on the current thread, as described with reference to 802, the last transfer object in the chain may call a wait function on the thread, putting it into sleep mode. Later, when the last transfer object has completed its request, the last transfer object may execute its callback function to set an event (on the last system thread at kernel-dispatch level), as in 814. The waiting thread which is in sleep mode may then be awakened in response to the event, and continue processing.

As will be clear to one skilled in the art, by using the above process of creating transfer objects and chaining them together for execution, the transitions back and forth between passive and dispatch level thread execution for each of the transfer request executions may be reduced or avoided, saving significant overhead costs in terms of CPU time and resources. If the series of requests is initiated in user mode (passive), rather than kernel mode (passive), then in some embodiments, the present invention may provide even greater benefits with respect to overhead as the corresponding user/kernel mode transitions may be avoided, given that user/kernel mode transitions are generally very expensive in terms of CPU cycles.

Furthermore, the modular design of the transfer object, which encapsulates the platform-dependent aspects of the data-transfer process, makes it much easier to develop and maintain driver software for a variety of platforms and buses/protocols, in that the developer need only supply a customized request block object and the appropriate toolbox functions to support a new platform and bus/protocol. The transfer object interface and use remain unchanged.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for transferring data over an external transmission medium, the method comprising:
   receiving a plurality of transfer requests;
   building a chain of transfer objects, wherein each transfer object corresponds to one of the plurality of transfer requests, wherein said building the chain of transfer objects includes linking the plurality of transfer objects together sequentially; and
   sequentially performing the request of each transfer object in the chain of transfer objects, wherein said sequentially performing the request of each transfer object in the chain of transfer objects comprises performing a request of a current transfer object;
   wherein said performing the request of the current transfer object is executed on a first thread at passive level if the current transfer object is the first transfer object in the chain; and
   wherein said performing the request of the current transfer object is executed on a system thread at kernel-dispatch level if the current transfer object is not the first transfer object in the chain.

2. The method of claim 1, wherein the building the chain of transfer objects comprises:
   creating a plurality of transfer objects; and
   attaching a user callback function to zero or more of the plurality of transfer objects.

3. The method of claim 2, wherein said creating the plurality of transfer objects comprises:
   allocating memory for each of the plurality of transfer objects;
   populating each of the plurality of transfer objects with transfer information, wherein the transfer information comprises one or more transfer types;
   allocating memory for a plurality of request block objects, wherein each of the plurality of request block objects corresponds to one of the plurality of transfer objects, wherein each of the request block objects is comprised in a corresponding one of the transfer objects, and wherein each of the request block objects provides an operating system-independent and bus-independent interface which encapsulates operating system-dependent and bus-dependent data; and
   populating each of the plurality of request blocks with operating system-dependent and bus-dependent information related to a request of a corresponding transfer object.

4. The method of claim 3, wherein the one or more transfer types comprise one or more of a read transfer, a write transfer, a single point transfer, a block transfer, a synchronous transfer, an asynchronous transfer, a random read transfer, or a random write transfer.

5. The method of claim 1, wherein said sequentially performing the request of each transform object in the chain of transfer objects reduces passive/dispatch level transitions.

6. The method of claim 1, wherein said sequentially performing the request of each transform object in the chain of transfer objects reduces user/kernel mode transitions.

7. The method of claim 1, wherein said sequentially performing the request of the current transform object further comprises:
   executing a static callback function to return control to the current transfer object on the system thread at kernel dispatch level;
   executing a first callback function of the current transfer object to complete the request on the system thread at kernel dispatch level;
   executing the first callback function of the current transfer object to set an event on the system thread at kernel dispatch level, wherein the event signals completion of the request;
   determining if there is a user callback function attached to the current transfer object; and
   executing the user callback function on the system thread at kernel dispatch level if there is a user callback function attached to the current transfer object.

8. The method of claim 7,
   wherein said performing the request of the first transfer object on the first thread at passive level comprises performing the request of the first transfer object on the first thread at kernel-passive level.

9. The method of claim 7,
wherein said performing the request of the first transfer object on the first thread at passive level comprises performing the request of the first transfer object on the first thread at user-passive level.

10. The method of claim 7, further comprising:
a last transfer object in the chain calling a wait function on the first thread after the performing the request of the first transfer object in the chain of transfer objects, wherein the calling the wait function on the first thread puts the first thread into a sleep mode;
wherein the first thread is awakened from the sleep mode in response to the current transfer object setting an event on the system thread at kernel dispatch level, wherein the event signals completion of the request; and
wherein the current transfer object is the last transfer object in the chain.

11. The method of claim 1,
wherein said external transmission medium comprises an IEEE 1394 bus, wherein said IEEE 1394 bus is implemented in accordance with an IEEE 1394 protocol specification.

12. The method of claim 1,
wherein said external transmission medium comprises a Universal Serial Bus (USB) bus.

13. The method of claim 1,
wherein said external transmission medium uses the Ethernet protocol.

14. A system for transferring data, the system comprising:
a host system including a processor and memory, wherein the memory stores data and driver software, and wherein the processor is operable to execute the driver software;
an external communications medium; and
a device, wherein the device is coupled to the host system through the external transmission medium;
wherein the driver software is executable to receive a plurality of transfer requests, build a chain of transfer objects, and submit the chain of transfer objects for execution by the host system;
wherein each of the plurality of transfer objects corresponds to one of the plurality of transfer requests, and wherein each of the transfer objects is operable to perform a request to read from or write to the device; and
wherein the host system is operable to perform the request of each transfer object in the chain of transfer objects sequentially, wherein the request of the first transfer object in the chain of transfer objects is executed on a thread at passive level, and wherein the requests of subsequent transfer objects in the chain of transfer objects are executed on one or more system threads at kernel-dispatch level.

15. The system of claim 14,
wherein each of the plurality of transfer objects comprises:
transfer information, wherein the transfer information includes one or more transfer types;
a request block object, wherein the request block object provides an operating system-independent and bus-independent interface which encapsulates operating system-dependent and bus-dependent data related to a request of a corresponding transfer object, and wherein the request block object implements the external communications medium protocol in an operating system specific data structure;
a link which is operable to provide access to another transfer object;
an intrinsic callback function; and
a static callback function.

16. The system of claim 15,
wherein one or more of the plurality of transfer objects each further comprises a user callback function.

17. The system of claim 14,
wherein the software being executable to build a chain of transfer objects includes the software being executable to:
allocate memory for each of the plurality of transfer objects;
populate each of the plurality of transfer objects with transfer information which comprises one or more transfer types;
allocate memory for a plurality of request blocks, wherein each of the plurality of request blocks corresponds to one of the plurality of transfer objects, and wherein each of the request blocks is comprised in a corresponding one of the transfer objects, wherein each of the request block objects provides an operating system- and bus-independent interface which encapsulates operating system- and bus-dependent data;
populate each of the plurality of request blocks with operating system- and bus-dependent information relating to the request of the transfer object;
attach a user callback function to zero or more of the plurality of transfer objects; and
chain the plurality of transfer objects together sequentially.

18. The system of claim 14,
wherein the host system being operable to perform the request of each transform object in the chain of transfer objects sequentially comprises the host system being operable to perform a request of a current transfer object on a first thread at passive level if the current transfer object is the first transfer object in the chain; and perform the request of the current transfer object on a system thread at kernel-dispatch level if the current transfer object is not the first transfer object in the chain.

19. The system of claim 18, wherein the host system being operable to perform the request of the current transfer object further comprises the host system being operable to:
execute a static callback function to return control to the current transfer object on the system thread at kernel dispatch level;
execute the intrinsic callback function of the current transfer object to complete the request on the system thread at kernel dispatch level;
execute the intrinsic callback function of the current transfer object to set an event on the system thread at kernel dispatch level, wherein the event signals completion of the request;
determine if there is a user callback function attached to the current transfer object;
execute the user callback function of the current transfer object on the system thread at kernel dispatch level if there is a user callback function attached to the current transfer object.

20. The system of claim 18,
wherein the host system being operable to perform the request of the first transfer object on the first thread at passive level comprises the host system being operable to perform the request of the first transfer object on the first thread at kernel-passive level.

21. The system of claim 18,
wherein the host system being operable to perform the request of the first transfer object on the first thread at passive level comprises the host system being operable to perform the request of the first transfer object on the first thread at user-passive level.

22. The system of claim 18,
wherein the host system is further operable to execute a wait function of a last transfer object in the chain on the first thread after the performing the request of the first transfer object in the chain of transfer objects, wherein the executing the wait function of the last transfer object in the chain on the first thread puts the first thread into a sleep mode; and
wherein the first thread is awakened from the sleep mode in response to d) executing the intrinsic callback function of the current transfer object to set an event on the system thread at kernel dispatch level, wherein the event signals completion of the request, and wherein the current transfer object is the last transfer object in the chain.

23. The system of claim 14,
wherein the host system comprises a computer system.

24. The system of claim 14, wherein the one or more transfer types comprise one or more of a read transfer, a write transfer, a single point transfer, a block transfer, a synchronous transfer, an asynchronous transfer, a random read transfer, or a random write transfer.

25. The system of claim 14,
wherein said external transmission medium comprises an IEEE 1394 bus, and wherein said IEEE 1394 bus is implemented in accordance with an IEEE 1394 protocol specification.

26. The system of claim 14,
wherein said external transmission medium comprises a Universal Serial Bus (USB) bus.

27. The system of claim 14,
wherein said external transmission medium uses the Ethernet protocol.

28. The system of claim 14,
wherein the driver software comprises data acquisition driver software, and wherein the device comprises a data acquisition device.

29. The system of claim 14, further comprising a toolbox stored in the memory of the host computer, wherein the toolbox is operable to provide a generic interface to manage communications between drivers.

30. A transfer object, wherein the transfer object is configurable to encapsulate data transfer-related functionality to provide a generic interface for transmission of data over a variety of external transmission media and protocols, comprising:

transfer information, wherein the transfer information includes one or more transfer types;

a request block object, wherein the request block object provides an operating system-independent and bus-independent interface which encapsulates operating system-dependent and bus-dependent data related to a data transfer request, and wherein the request block object implements the external transmission medium protocol in an operating system specific data structure;

a link which is operable to provide access to another transfer object, wherein the link provides a mechanism for chaining transfer objects together;

an intrinsic callback function which is operable to execute a transaction to complete the data transfer request, and which is further operable to set an event signaling completion of the data transfer request; and a static callback function.

31. The transfer object of claim 30, further comprising:

a user callback function, wherein the user callback function is operable to execute a user-specified task after the data transfer request of the transfer object has been executed.

32. The transfer object of claim 30, wherein the one or more transfer types comprise one or more of a read transfer, a write transfer, a single point transfer, a block transfer, a synchronous transfer, an asynchronous transfer, a random read transfer, or a random write transfer.

* * * * *